June 10, 1941.  J. J. KANTER  2,244,881
COMBINED METAL AND TREATMENT
Filed April 4, 1940  4 Sheets-Sheet 1

Inventor:
Jerome J. Kanter

Patented June 10, 1941

2,244,881

UNITED STATES PATENT OFFICE 2,244,881

COMBINED METAL AND TREATMENT

Jerome J. Kanter, Palos Park, Ill., assignor to Crane Co., Chicago, Ill., a corporation of Illinois Application April 4, 1940, Serial No. 327,752

1 Claim. (Cl. 148—31)

This invention relates to a specially treated alloy steel material especially suitable for bolts and studs for high pressures and/or temperatures, as for example in the connections used in forming joints for valves, fittings, flanges and the like.

With the constantly increasing severity, both with respect to temperature and pressure in equipment of the character above referred to, alloy steel bolts and studs have become an essential requirement. For example, on such installations involving the transmission of steam power, or in an oil refinery, or in chemical plant service, the engineer has been able to design many of the bolted joints indispensable to high temperature pressure piping only through the employment of special heat treated alloy steel bolting materials.

It is therefore a principal object of this invention to provide for such special bolting material having a greater capacity to withstand elastic strains of the varied services realizing, that because of standardization, the dimensional standards for pipe and pressure-vessel flanges are not, from a practical standpoint, to be drastically changed.

It has become apparent through detailed study that the pressure holding ability of a bolted joint depends primarily upon the forces exerted by the bolts and studs in overbalancing the pressure load and when this balance of forces is not maintained, leakage will generally occur. Thus it becomes apparent that in order to obtain tight joints at high pressure loads it is necessary to employ bolting materials with high proportional limits and yield strengths, so as to be capable of maintaining loads at larger elastic strains.

It is well known further that the load maintained upon a bolted joint is dependent, to a large degree, upon the capacity of the bolt or stud to extend elastically. So long as this elastic extension is maintained, the bolt and the flange are loaded. Elastic deformation by conversion to plastic deformation, such as takes place in yielding or creep, decreases the loading against pressure and therefore the danger of leakage increases. It is thus readily appreciated that bolts or studs subjected to the high temperatures at which steels are known to creep are likely to permit a joint to reach the leakage point during the course of service, in the event that the elastic strain becomes dissipated into permanent plastic strain through creep. Briefly, leakage is then almost certain to result when the bolt load is reduced to the pressure load on the joint. The rate of creep obtaining in this situation is affected initially by the load and temperature, and gradually diminishes as the bolt load is dissipated. In other words, a very rigid flange, with apparently no elastic deflection under load, permits a complete relaxation of load when the creep strain in the stud or bolt accumulates to an amount equivalent to the elastic strain of pulling up the joint. However, in the case of a deflecting or "springy" flange, it is necessary for enough creep strain to accumulate so as to equal the elastic displacement of the flange before complete relaxation is attained. Thus the greater the sum of elastic displacements in the making up or effecting of a flanged joint, the longer may be the period to leakage under creep conditions.

Figure 1:
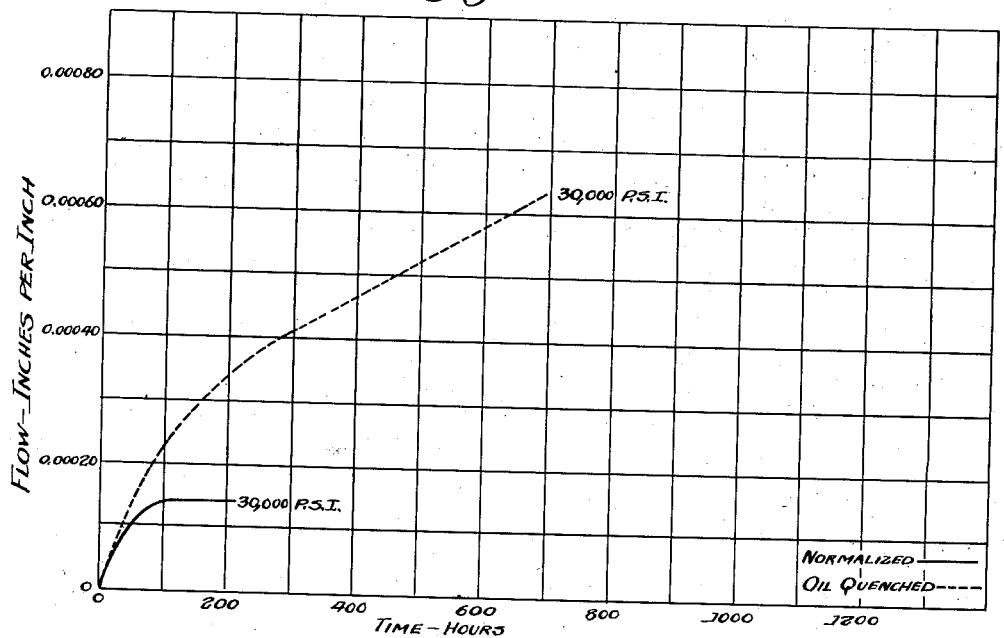
Fig. 1 shows a flow chart of the same metal respective after an oil quench and also after being normalized in accordance with the teachings of this invention, at a temperature of 800° F.
Figure 2:
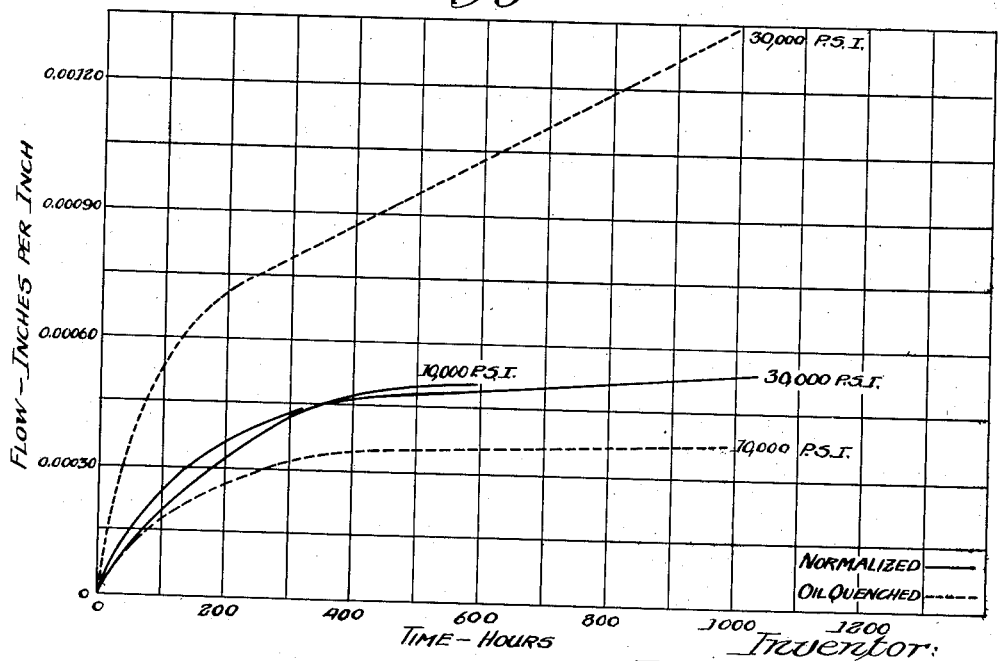
Fig. 2 shows a chart prepared under circumstances similar to Fig. 1, but at a temperature of 900° F., and under respective loads of 10,000 and 30,000 lbs. per square inch.
Figure 3:
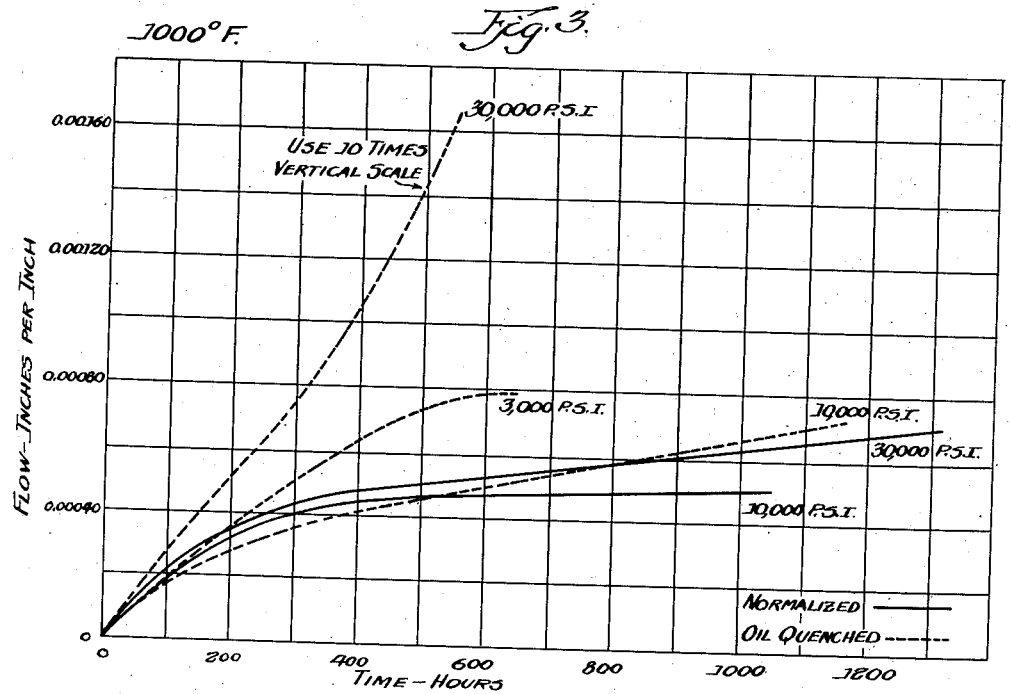

Fig. 3 also shows a chart similar to Fig. 2, but at a temperature of 1000° F.

Figure 4:
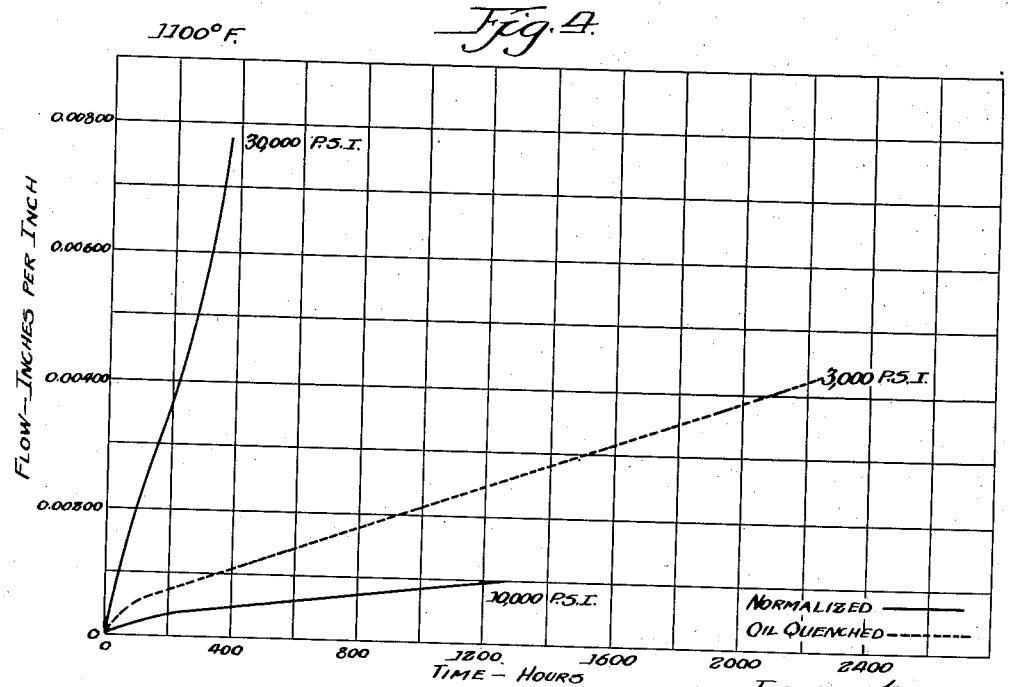

Fig. 4 shows a chart similar to Fig. 2, but at a temperature of 1100° F.

Figure 5:
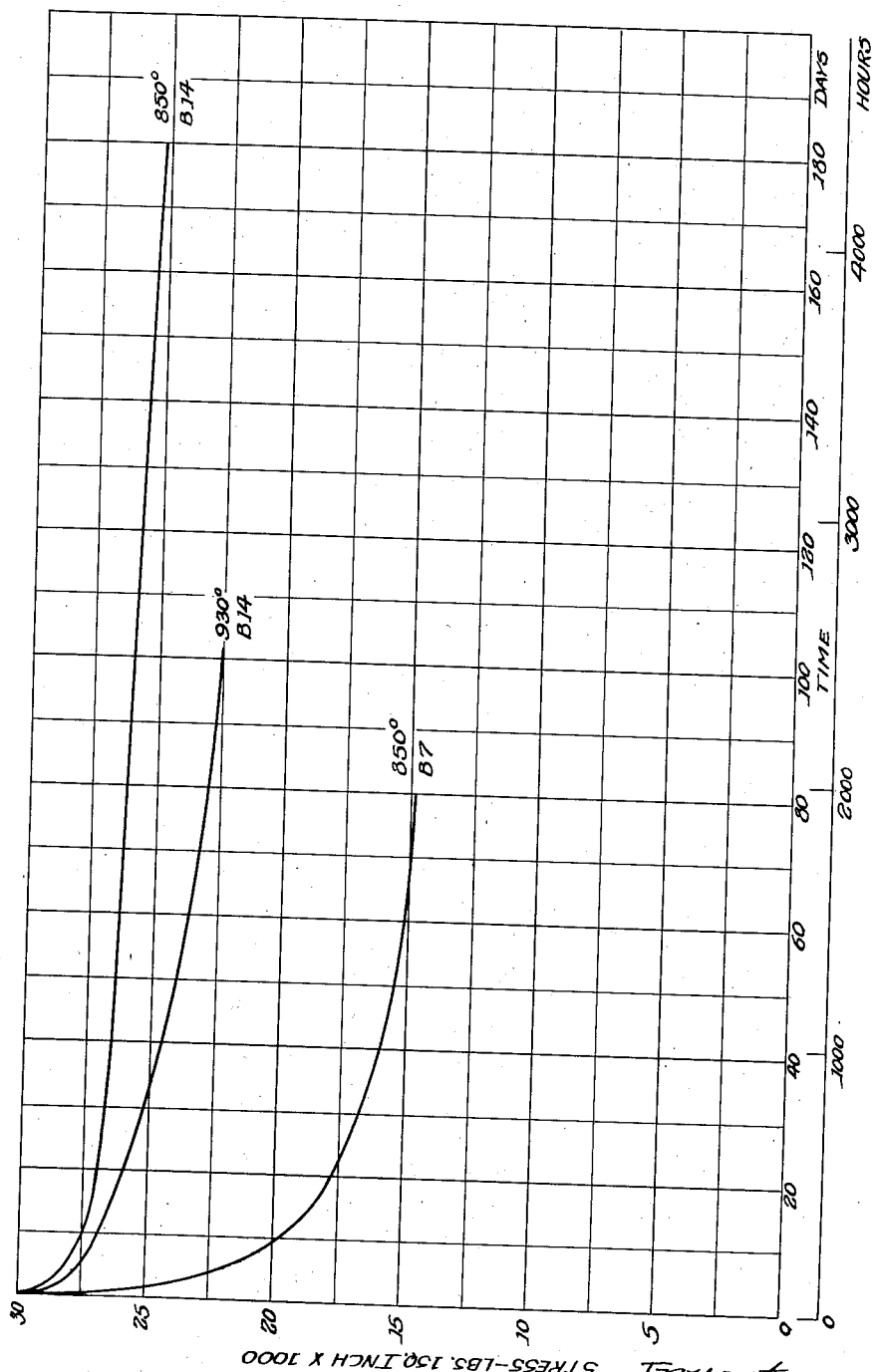

Fig. 5 is a relaxation graph formed by the tabulation of results hereinafter to be described at greater length.

Figure 6:
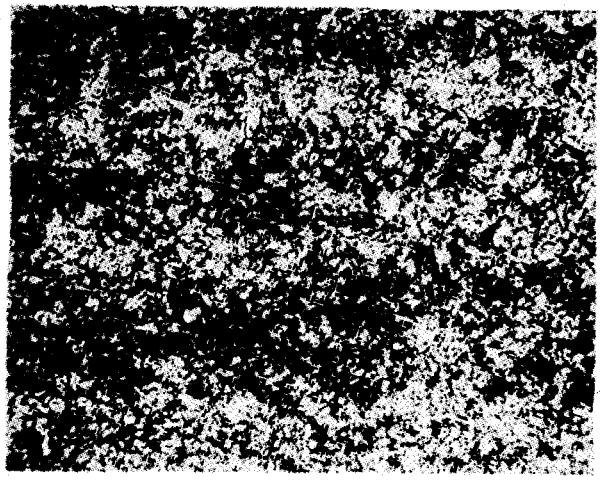

Fig. 6 is a photo-micrograph of a bolt steel of the character hereinafter to be described, oil quenched and drawn, and with a magnification of 500 diameters.

Figure 7:
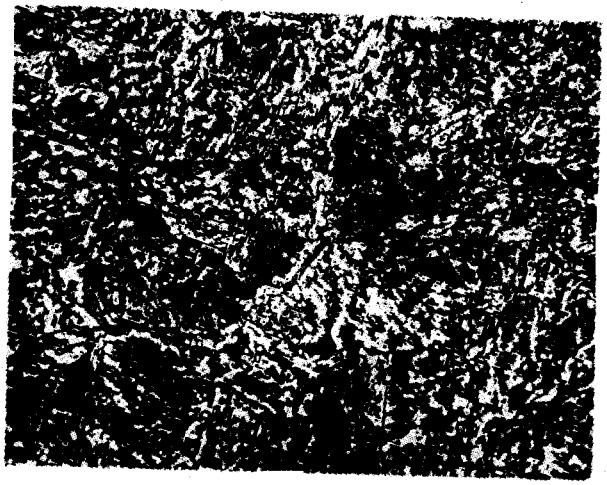

Fig. 7 is a photo-micrograph of the same steel as normalized and drawn in accordance with my invention, also with a magnification of 500 diameters.

My novel combined alloy and treatment hereinafter to be described in greater detail, in a practical manner eliminates the foregoing objections.

My invention relates to a chromium, molybdenum, vanadium steel which is unique in that it is the only one which specifically requires a normalizing (sometimes called air quenching) treatment followed by a draw for its effectiveness for the purpose intended. This steel, as a superior high temperature bolting steel, was developed as the result of creep and relaxation studies and was introduced for high temperature applications as a bolting material. A normalized alloy bolting steel for high temperature application is a novel departure but the treatment, as hereinafter outlined in greater detail, was found to produce a most advantageous combination of both elastic and relaxation resisting properties in the resultant metal.

The problem of selecting a steel for service applications where actual metal temperatures in excess of 850° F. are encountered was discovered by the initial determination of using a proper alloy steel which could be used for bolts and studs in the normalized and drawn condition so as to thereby combine the structure with adequate tensile strength, elasticity, hardness and ductility to meet the requirements of the American Society of Testing Materials and other specification-writing bodies. It should be apparent from what has already been said that not only must a bolt or stud have adequate leakage resistance while hot, but it must necessarily be able to withstand the subsequent abuses of being placed under great strain while being installed or retightened as a bolting material. The point of this statement is that while certain compositions previously have been found to have improved creep resistance by normalizing instead of oil quenching, few, if any of these compositions, have combined a normalized structure with acceptable tensile properties.

A chromium, molybdenum, vanadium composition having the following average analysis and physical properties was discovered to have excellent tensile properties for alloy steel bolting after the normalizing and draw treatment comprising in combination my invention:

| | |
|---|---|
| Carbon | .35 to .50 per cent |
| Manganese | .40 to .70 |
| Phosphorus | .04 maximum |
| Sulphur | .05 maximum |
| Silicon | .15 to .30 |
| Chromium | .80 to about 1.10 |
| Molybdenum | .30 to .40 |
| Vanadium | .20 to .30 |

Tensile strength___135,000 pounds per square inch
Yield point_____115,000 pounds per square inch
   15% elongation
   45% reduction in area Oil quenched, this steel is excessively hard initially and it softens upon drawing until at about 1200° F., approximately equivalent properties to the normalized steel are established.

These materials, when treated in the manner above stated, tend to develop martensitic structures upon oil quenching with hardnesses in excess of 500 Brinell. A "draw" or temper subsequent to the quench tends to coalesce the highly dispersed carbide constituents into particles distinguishable under the microscope in polished and etched sections at moderately high magnifications.

As to Fig. 5, this graph further emphasizes the advantage obtained in high temperature strength of the steel normalized per the teachings of my invention, designated as B—14, over the oil quenched steel, designated as B—7, by study of the comparison shown of the relaxation curves indicated therein. On this graph it will be noted that at 850° F. temperature after a substantial period of test amounting to 180 days, a decline from 30,000 pounds per square inch to 25,300 pounds per square inch was registered for the normalized steel, designated as B—14, which is a steel treated per my invention. This test indicates clearly that a number of years would be required for relaxation to 15,000 pounds per square inch which is the approximate stress at which leakage occurs in the usual high pressure flanged joint. A high grade bolting steel such as is ordinarily available in present day joints under the same condition is observed to relax to this 15,000 pounds per square inch leakage point in 63 days, at which time retightening of the joint would then become necessary. It will be further observed that even at 930° F., the curve for the steel hereinabove described in this application indicates that an indefinitely long period is required before retightening of the bolts becomes necessary. Thus the steel subjected to my treatment may be applied under conditions of service where periodic retightening of the nut is not feasible.

Referring further to Fig. 7, it is evident that the steel described in my present invention, after proper drawing treatment at 1200° F., that is the temperature above the critical range which produces a much slower cooling effect than liquid quenching, as shown in the microstructure, also results in much coarser features than the oil quenched structure. Further, inspection of the normalized structure of the steel shown in Fig. 7 indicates a definite outline of grains. These are of equivalent size to the austenitic or "heat treatment temperature range" which, due to the relatively slow cool, were not highly affected or distorted as is true of those formed by liquid quenching. In further explanation, in the normalizing process each austenite grain has been transformed into a ferritic-pearlitic grain without subdivision. The dark constituents dispersed through the grains in Fig. 7 are essentially carbides of vanadium and probably molybdenum. In the case of oil quenching, as shown in Fig. 6, however, each austenite grain appears to have given rise to a number of new "granular" subdivisions.

It is therefore quite apparent that liquid quenching results in a greater disorganization of the crystalline structure of the steel than normalizing. It is perhaps due to this greater degree of disorganization, or smaller "granular unit," that the poor creep resistance is largely attributable. Study based upon the relation of creep resistance to microstructure tends to show that there exists an optimum "grain size" range in which the alloy steel is most resistant to creep.

Finer grain size than that shown represents too great a proportion of the material in the "disorganized" condition which promotes creep, while the larger grain size does not afford enough "keying" against plastic deformation, sometimes called "slip interference." Thus the optimum creep resistance may be conceived as existing for that "grain size" which permits the least grain boundary or disorganized material in ratio to "keyed" slip planes.

Briefly, it is now submitted that this grain size concept has proved very useful in interpreting creep data, and particularly in working out heat treatments for attaining improved creep strength and relaxation resistance in alloy bolting steel for use on high temperatures.

In summation, considering Fig. 6 which is of an oil quenched steel as distinguished from one normalized, it will be evident that the steel being first transformed into martensite, upon hardening, precipitates a carbide of very fine structure. The latter structured carbide gives, in effect, a very fine grain which is definitely associated with poor creep resistance. In contradistinction, as per Fig. 7, the photo-micrograph shows that the normalized steel preserves a grain size unit which is identical with the original austenite grain size, and this structure is associated with very high creep resistance. The figure shows the original austenite grain size clearly defined, while the photo-micrograph for the oil quenched sample (Fig. 6) shows no evidence of it whatsoever.

Thus it has been discovered, upon the preservation of this austenite grain boundary in the structure of the creep resistant steel through cooling so controlled, that a precipitated carbide results from the transformation product with no tempering required to produce it. It should be noted that in the case of oil quenching, the carbon is held in solid solution and precipitates only upon tempering.

It is quite apparent that of course the detailed analysis, with respect to the various elements above recited as being average, may vary and therefore the scope of this invention should be measured by the following claim in relation to the prior art, as herein appended.

I claim:

A rolled material for bolts and the like for application to service temperatures in excess of 850° F., the said material being an alloy steel, containing the elements of chromium, molybdenum, and vanadium, having chromium within the range of .80 to 1.10%, molybdenum .30% to .40%, vanadium .20% to .30%, carbon about .35% to .50%, manganese about .40 to .70%, silicon about .15 to .30%, the remainder of the steel being substantially iron, the said material being treated by cooling in air at atmospheric temperature from temperatures above the $A_3$ point to temperatures below the $A_1$ point whereby a structure is obtained rendering optimum creep and relaxation resistance, the austenite grain boundary being preserved in the structure of the said creep resistant steel through cooling so controlled that a precipitated carbide results from the transformation product with no tempering required to produce it.

JEROME J. KANTER.